Jan. 31, 1933.  M. J. B. BARBAROU  1,895,874
DRIVING ARRANGEMENT FOR AIRCRAFT PROPELLERS
Filed Jan. 29, 1931   2 Sheets-Sheet 1
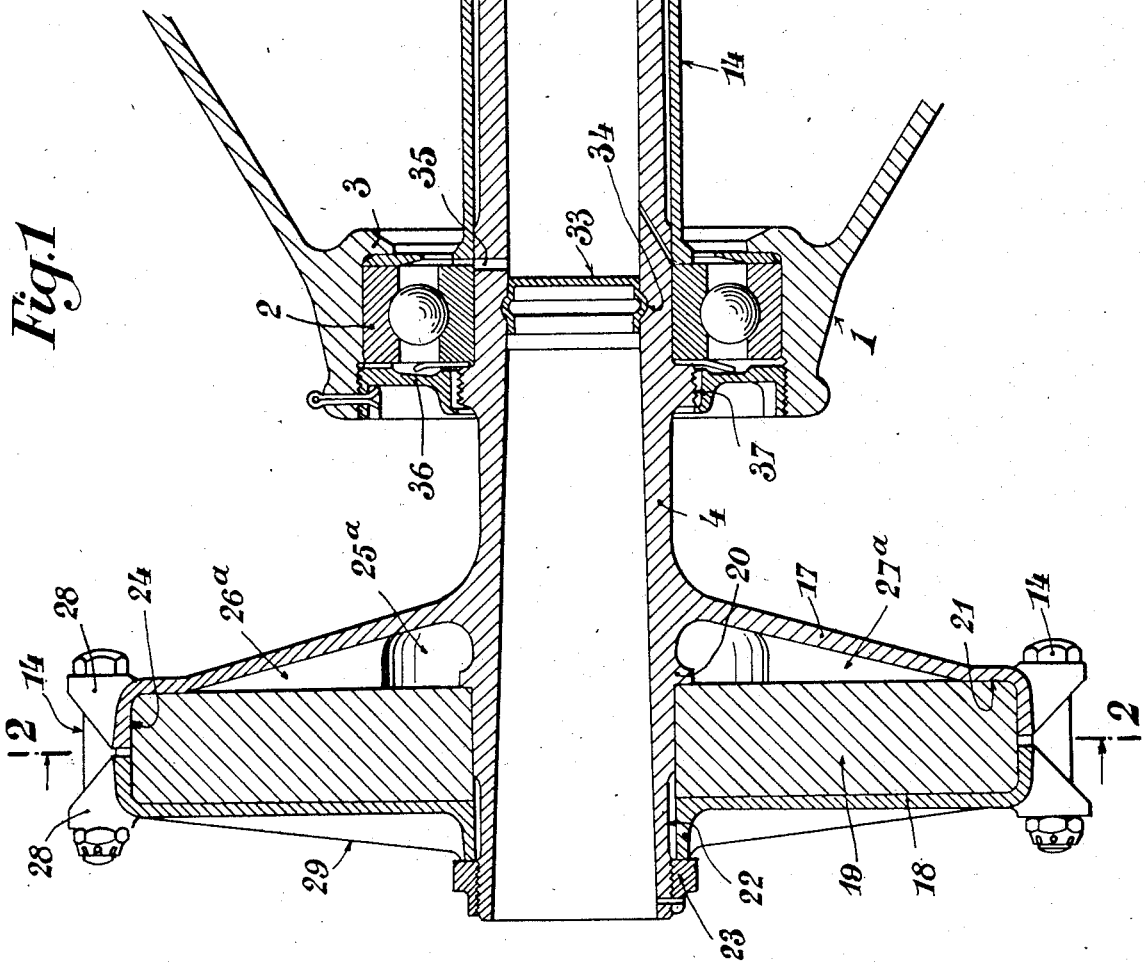
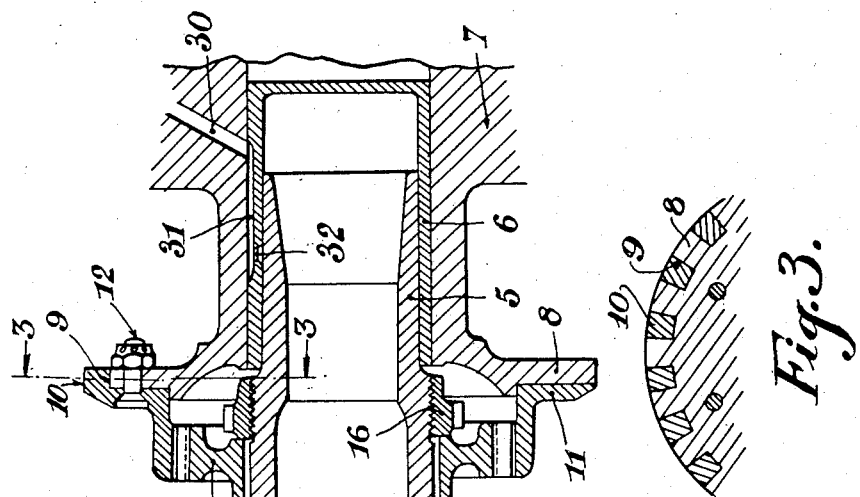
Marius Jean Baptiste Barbarou
INVENTOR;
his Attorney.

Jan. 31, 1933.    M. J. B. BARBAROU    1,895,874
DRIVING ARRANGEMENT FOR AIRCRAFT PROPELLERS
Filed Jan. 29, 1931    2 Sheets-Sheet 2

Marius Jean-Baptiste Barbarou
INVENTOR;
by Otto Munk
his Attorney.

Patented Jan. 31, 1933

1,895,874

UNITED STATES PATENT OFFICE

MARIUS JEAN-BAPTISTE BARBAROU, OF NEUILLY-SUR-SEINE, FRANCE

DRIVING ARRANGEMENT FOR AIRCRAFT PROPELLERS

Application filed January 29, 1931, Serial No. 512,040, and in France February 7, 1930.

The invention relates to an improved arrangement for driving aircraft propellers, and it has chiefly for its object to provide means for securely and efficiently supporting the propeller shaft which is subjected to vibrations and deformations in operation.

Usually, the propeller is provided with a hub, which comprises a sleeve and two end plates adapted to clamp the propeller, said sleeve being secured to the forwardly projecting end of the propeller shaft in an overhung position, by a tapered fit and a key or by flutes.

In practice, the propellers of aircraft are subjected to intense vibrations, which bring about the rapid destruction of the connecting parts between the propeller and its shaft. To avoid this, the length of the hub must be considerably increased, thus increasing unduly the weight of the overhanging parts. The effect of such vibrations is considerably increased by reason of this overhung mounting of the propeller, and the driving torque is transmitted to the propeller in a region where the propeller shaft is supported at one side only.

The invention has for its object to prevent or reduce the effect of the vibrations by transferring the flutes, which usually connect the propeller hub with the propeller shaft in a portion of the propeller shaft where the latter is rigidly held against vibrations.

According to the invention, the propeller shaft, which is integral with a member adapted to hold the propeller in combination with a clamping disk and suitable clamping members, is provided, in the portion comprised between the forward thrust ball bearing for the propeller shaft and the forward bearing for the crankshaft, with flutes engaging corresponding inner flutes of a sleeve, having a driving connection with the crankshaft, the latter having an axial bore for receiving the inner end of the propeller shaft.

Due to this arrangement, the vibrations generated by the propeller or the engine are properly absorbed by the portion of the propeller shaft comprised between the two bearings above mentioned, thus affording a sound and durable driving connection between the crankshaft and the propeller shaft.

Moreover, the thrust ball bearing is generally spaced through a material distance from the forward bearing for the crankshaft (in order to improve the aerodynamic qualities of the aircraft). The space which is available between said bearings and is usually not utilized, permits of increasing as much as desired the length of the fluted sleeve, and to subsequently reduce to a great extent its thickness and weight for a given power to be transmitted.

The fluted mounting of said sleeve affords the ready dismounting of the propeller, together with its integral propeller shaft. The great length of the flutes also reduces the pressure along the surfaces of contact and, in a general manner, the whole arrangement is stronger, and more rigid, although it is lighter than the arrangements heretofore provided.

The invention further relates to improvements in the mounting of the propeller and in the lubricating means for the mechanism.

In the accompanying drawings which are given merely by way of example, Fig. 1 is a lengthwise section of a preferred embodiment of the invention;

Fig. 3 is a partial section on the line 3—3 of Fig. 1.

Figure 2:
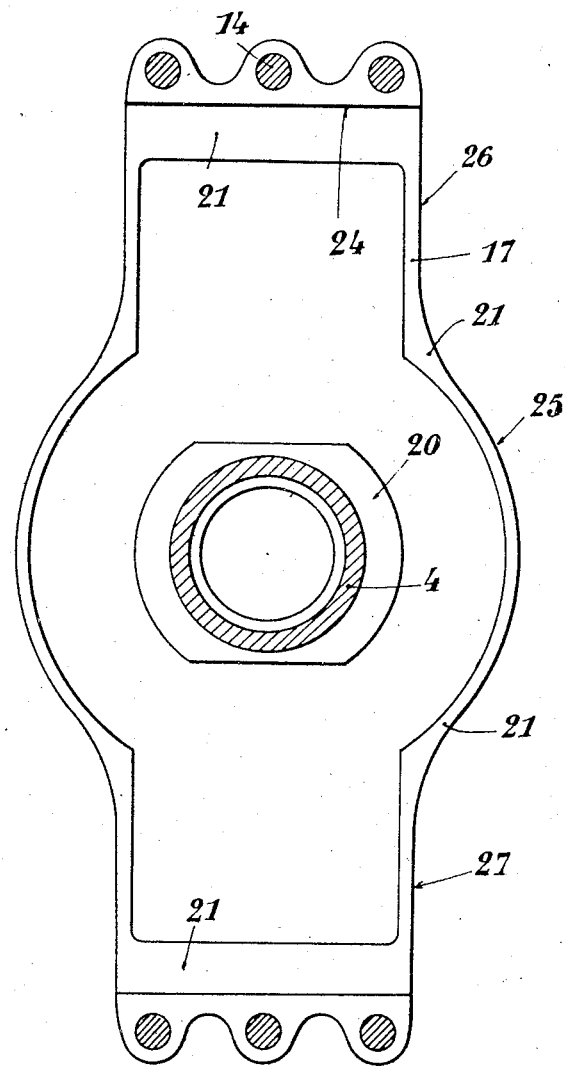
Fig. 2 is a section on the line 2—2 of Fig. 1.

Referring to the drawings, 1 denotes the crankcase, 2 a thrust roller bearing engaging a shoulder 3 of the crankcase and adapted to rotatably support the propeller shaft 4. The inner end of said propeller shaft has a tail portion 5 engaging a bearing sleeve 6 fitted in an axial bore at the end of the crankshaft 7.

Integral with the crankshaft 7 is a disk 8 provided at its periphery with notches 9 engaging claws 10 projecting rearwardly from an annular member 11, secured to said disk portion 8 by bolts 12. Member 11 has an inner toothing engaging an external toothing formed at the periphery of a disk 13 integral with a sleeve 14 extending close to the thrust ball bearing 2. Said sleeve is connected with the propeller shaft by a series of longitudinal flutes 15 and is held axially by a nut 16 screwed on the propeller shaft 4 and locked in place by suitable means.

At the outer end of the propeller shaft 4 is an integral member 17 which cooperates with a removable clamping disk 18 for holding the central part 19 of the metallic propeller; member 17 comprises a circular disk-shaped portion 25 and two diametrical extensions 26, 27. The rear walls of extensions 26, 27 are conical and merge into the rear wall of portion 25. The lateral walls of said extensions also merge into the lateral walls of portion 25 and the outer edges 21 of said lateral walls are machined in order to lie in a common transverse plane. The outer ends of extensions 26, 27 are bent at right angles as shown at 24, the bent portions being formed with outer bosses 28 adapted to receive clamping bolts 14 and said portions clamping the propeller 19 therebetween. The central part 19 of the propeller bears against a shoulder 20 of the propeller shaft and the plane edge portions 21 of member 17. The clamping disk 18, provided with radial strengthening ribs 29, is secured to the propeller shaft by longitudinal flutes 22 and is held axially by a nut 23. The hollow parts 25ª, 26ª, 27ª are provided to reduce the weight, while securing a rigid assembly.

From the foregoing, it will be seen that the propeller shaft 4 is driven by the crankshaft 7 through the medium of the disk 8, the annular member 11 and the sleeve 14 in a region where the propeller shaft is properly held by its tail portion 5 at one side and the thrust ball bearing 2 at the opposite side, thus preventing the injurious effect of the vibrations of the propeller. The distance between the end of the crankshaft and thrust ball bearing 2, as above stated, is quite large, whereby the flutes 15 of the sleeve 14 may have a great length and the sleeve may be given a reduced thickness and weight, while possessing the required strength. The pressure between the flutes is materially reduced and the pressure between the teeth of the disk portion 13 and the annular member 11 are also very small by reason of the relatively large diameter which may be given to said annular member 11.

The lubrication may be effected in the following manner:

Lubricant under pressure is forced through a duct 30 in the crankshaft 7 into an axial groove 31 of the sleeve 6, thence through a duct 32 between said sleeve and the tail part 5 and thence into the hollow propeller shaft 4, which is closed, adjacent the thrust bearing 2, by a flanged disk 33 having a projecting rib 34 adapted to spring into an annular recess formed in the inner wall of the propeller shaft. Adjacent said disk is a duct 35, leading to the ball bearing 2. Oil is prevented from escaping by a nut 36, which serves to hold the ball bearing 2 in place and cooperates with a screwthread 37 whose pitch has the proper direction, for opposing the escape of oil.

If it is desired to alter the angular position of the propeller with respect to the crankshaft 7, for balancing purposes, the nut 36 is unscrewed and the propeller shaft 4 is shifted axially with the thrust ball bearing 2 by means of a suitable tool, until the toothings which connect the parts 11 and 13 are disengaged from one another. The length of said toothings is such that the thrust ball bearing need not be completely extracted from its recess in the crankcase. The propeller is then rotated, with the crankshaft held stationary, through the desired angle, and is then pushed inwardly to reengage the toothings and the nut 36 is screwed again in place.

Obviously, the invention is not strictly limited to the constructional details above described and various modifications may be made without departing from the scope of the invention.

Having now described my invention what I claim as new and desire to secure by Letters Patent is:

1. An arrangement for driving a propeller shaft from an engine shaft comprising a thrust bearing in the engine crankcase for supporting the front end of said propeller shaft, a bearing adjacent the rear end thereof, flutes on said shaft between said bearings, an internally fluted sleeve engaging the fluted portion of said shaft and a driving connection between said sleeve and the engine shaft, the rear end of said propeller shaft extending into the front end of said engine shaft.

2. An arrangement as claimed in claim 1, wherein said driving connection comprises a fluted disk integral with said sleeve at the rear end thereof, and a toothed annular member secured to the engine shaft and engaging said fluted disk.

3. An arrangement as claimed in claim 1, wherein said driving connection comprises a fluted disk integral with said sleeve at the rear end thereof, a toothed annular member engaging said fluted disk and a claw connection between said annular member and said engine shaft.

4. An arrangement for driving a propeller shaft from an engine shaft which comprises a rigid connection between the propeller and said propeller shaft, two spaced bearings for said propeller shaft, an elongated sleeve between said bearings, a flute connection between said sleeve and said propeller shaft, a disk integral with said sleeve and having a larger diameter than the latter, and a flute connection between the periphery of said disk and said engine shaft.

5. An arrangement for driving an aircraft propeller from an engine shaft comprising a propeller shaft, propeller holding means integral with said shaft, means for securing the propeller to said holding means, a thrust bearing in the engine crankcase for supporting the front end of said propeller shaft, a bearing adjacent the rear end thereof, flutes on said shaft between said bearings, an internally fluted sleeve engaging the fluted portion of said shaft and a driving connection between said sleeve and the engine shaft, the rear end of said propeller shaft extending into the front end of said engine shaft.

6. An arrangement as claimed in claim 5, wherein said holding means comprises a member having transverse narrow plane contact surfaces adapted to engage the propeller hub and limiting hollowed out portions, and clamping flanges engaging said hub for preventing rotation of said propeller with respect to said member.

In testimony whereof I have signed my name to this specification.

MARIUS JEAN-BAPTISTE BARBAROU.